US012710884B2

(12) United States Patent
Ning et al.

(10) Patent No.: US 12,710,884 B2
(45) Date of Patent: Aug. 18, 2026

(54) PROGRAM VOLTAGE SELECTION DURING ALL LEVELS PROGRAMMING OF A MEMORY DEVICE

(71) Applicant: Micron Technology, Inc., Boise, ID (US)

(72) Inventors: Sheyang Ning, San Jose, CA (US); Lawrence Celso Miranda, San Jose, CA (US); Jeffrey S. McNeil, Nampa, ID (US); Tomoko Ogura Iwasaki, San Jose, CA (US); Lee-eun Yu, San Jose, CA (US); Yeang Meng Hern, Singapore (SG)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/593,779

(22) Filed: Mar. 1, 2024

(65) Prior Publication Data

US 2024/0295970 A1 Sep. 5, 2024

Related U.S. Application Data

(60) Provisional application No. 63/449,517, filed on Mar. 2, 2023.

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679

(Continued)

(56) References Cited

U.S. PATENT DOCUMENTS

2011/0134701 A1* 6/2011 Moschiano ............ G11C 16/10 365/185.19
2014/0321215 A1* 10/2014 Sakui ................ G11C 16/3427 365/185.24

(Continued)

OTHER PUBLICATIONS

NPL Takeuchi et al. "A Multipage Cell Architecture for High-Speed Programming Multilevel NAND Flash Memories" IEEE Journal of Solid-State Circuits, vol. 33, No. 8, Aug. 1998, pp. 1228-1238 (Year: 1998).*

*Primary Examiner* — Hosain T Alam
*Assistant Examiner* — Zubair Ahmed
(74) *Attorney, Agent, or Firm* — Lowenstein Sandler LLP

(57) ABSTRACT

Control logic in a memory device, identifies a set of a plurality of memory cells associated with a selected wordline to be programmed to respective programming levels during a program operation and causes a set of a plurality of pillars with which the set of the plurality of memory cells are associated to be boosted to respective pillar voltages corresponding to the respective programming levels. The control logic further causes a series of programming pulses to be applied to the selected wordline, wherein respective memory cells of the set of memory cells are programmed to each of the respective programming levels by each programming pulse in the series of programming pulses, wherein a first programming pulse in the series of programming pulses has a first magnitude, wherein a second programming pulse in the series of programming pulses has a second magnitude, and wherein the second magnitude of the second programming pulse is less than the first magnitude of the first programming pulse increased by a predefined pulse step amount.

17 Claims, 8 Drawing Sheets

(58) Field of Classification Search
USPC .................................................. 711/103, 102
See application file for complete search history.

(56) References Cited

U.S. PATENT DOCUMENTS

2021/0082510 A1* 3/2021 Yamada ............. G11C 16/0483
2024/0012563 A1* 1/2024 Shin ...................... G06F 3/0659

* cited by examiner

PROGRAM VOLTAGE SELECTION DURING ALL LEVELS PROGRAMMING OF A MEMORY DEVICE

RELATED APPLICATIONS

This application is a continuation of U.S. Patent Application No. 63/449,517 filed Mar. 2, 2023, the entire contents of which are hereby incorporated by reference herein.

TECHNICAL FIELD

Embodiments of the disclosure relate generally to memory sub-systems, and more specifically, relate to program voltage selection during all levels programming of a memory device in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
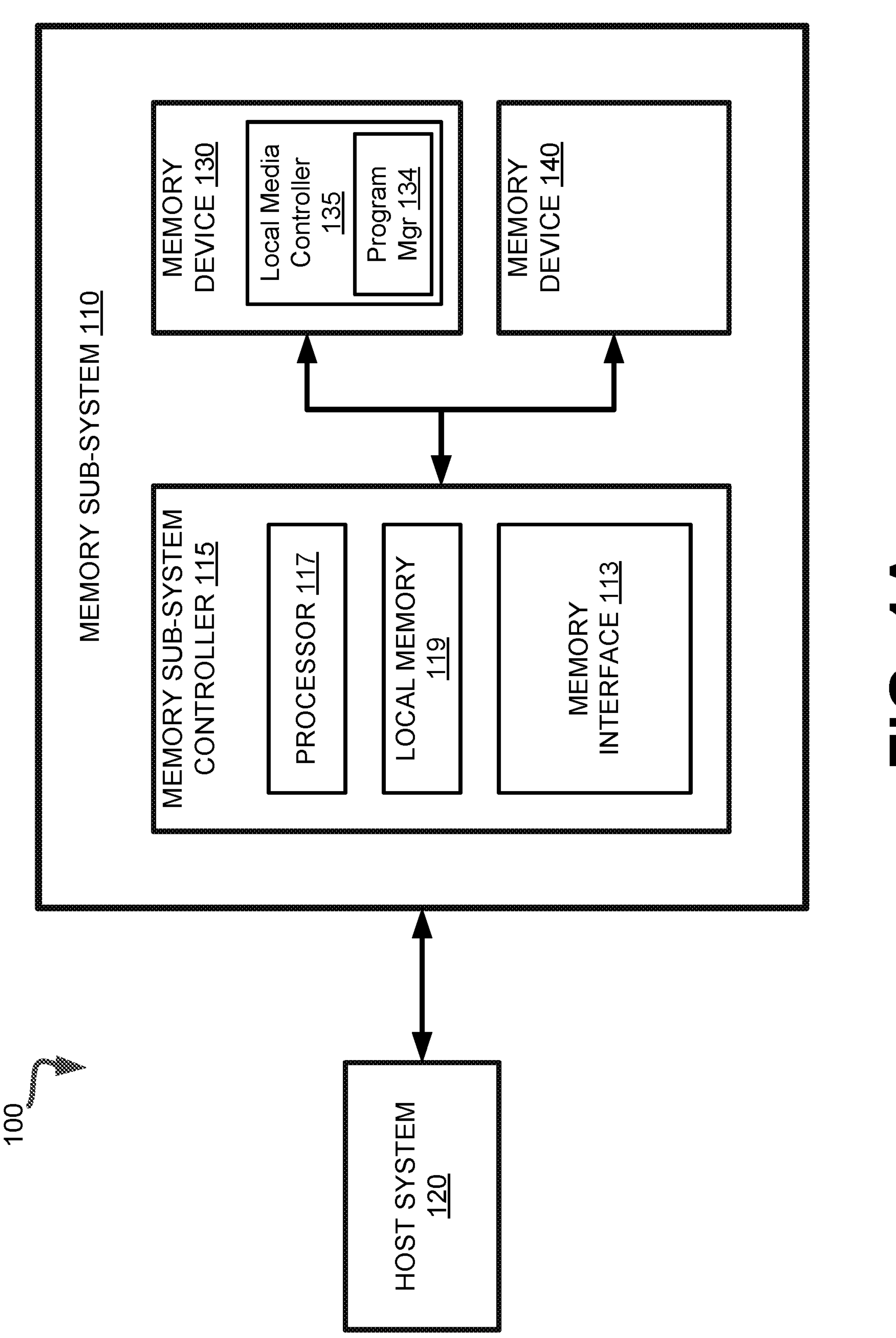
FIG. 1A illustrates an example computing system that includes a memory sub-system in accordance with some embodiments of the present disclosure.

Aspects of the present disclosure are directed to program voltage selection during all levels programming of a memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e. in stripes). Accordingly, one request to read a segment of data (e.g., corresponding to one or more data addresses), can result in read operations performed on two or more of the memory planes of the memory device.

Memory access operations (e.g., program operations, read operations, erase operations) can be executed with respect to the memory cells by applying a wordline bias voltage to wordlines with which memory cells of a selected page are associated. For example, during a programming operation, one or more selected memory cells can be programmed by the application of a programming voltage to a selected wordline. In one approach, an Incremental Step Pulse Programming (ISPP) process or scheme can be employed to maintain a tight cell threshold voltage distribution for higher data reliability. In ISPP, a series of high-amplitude pulses of voltage levels having an increasing magnitude (e.g., each successive pulse increases by a predefined pulse step height)

is applied to wordlines with which one or more memory cells are associated to gradually raise the voltage level of the memory cells to above a wordline voltage level corresponding to the memory access operation (e.g., a target program voltage level). The application of the uniformly increasing pulses by a wordline driver of the memory device enables the selected wordline to be ramped or increased to a wordline voltage level ($V_{wl}$) corresponding to the memory access operation. Similarly, a series of voltage pulses having a uniformly increasing voltage level can be applied to the wordline to ramp the wordline to the corresponding wordline voltage level during the execution of an erase operation.

The series of incrementing voltage programming pulses are applied to the selected wordline to increase a charge level, and thereby a threshold voltage, of each memory cell associated with that wordline. After each programming pulse, or after a number of programming pulses, a program verify operation can be performed to determine if the threshold voltage of the one or more memory cells has increased to the desired programming level. For example, the pulses can be incrementally increased in value (e.g., by a step voltage value such as 0.3 V) to increase a charge stored on a charge storage structure corresponding to each pulse. The memory device can reach a target programming level voltage for a particular programming level by incrementally storing or increasing amounts of charge corresponding to the programming step voltage.

According to this approach, the series of programming pulses and program verify operations are applied to program each programming level (e.g., programming levels L1 to L7 for a TLC memory cell) in sequence. For example, this approach sequentially programs the levels of the memory cell (e.g., L1 to L7) by applying a first set of pulses to program level L1 memory cells to a first target voltage level, followed by the application of a second set of pulses to program level L2 memory cells to a second target voltage level, and so on until all of the levels are programmed.

In this approach, each level may require multiple programming pulses and program verify operations to reach the target programming voltage associated with the respective programming level. Accordingly, this results in a long time to program (e.g., a time from an initial programming pulse until the program verify threshold voltage is reached, also referred to as Tprog) associated with the one or more memory cells. For example, programming each level of a TLC memory cell (e.g., programming levels L1 to L7) one at a time requires a high number of total programming pulses (e.g., approximately 24 pulses) and a high number of associated program verify operations (e.g., approximately 42 program verify operations). In this example, if a time associated with each pulse is 37.5 μs, the total time for the set of pulses (i.e., 24 pulses) is 900μs. In addition, the time associated with performing the program verify operations can add an additional 900 μs, resulting in a total program time of, for example, 1800 μs.

In an attempt to reduce the number of programming pulses performed in the programming operation, some memory devices utilize an all levels programming approach. Rather than sequentially programming the multiple programming levels (e.g., levels L1 to L7 of TLC memory), these memory devices program all of the programming levels together with each programming pulse. For example, the all levels programming operation includes a first phase wherein respective pillars (e.g., vertical conductive traces) corresponding to the memory cells to be programmed to the multiple programming levels (e.g., L1 to L7 for a TLC memory device) are boosted to corresponding voltage levels (e.g., Vpillar for programming level L1 is boosted to a highest value, Vpillar for programming level L2 is boosted to a next highest value and so on to Vpillar for programming level L0 which remains 0V during the first phase). Then in a second phase, a programming pulse is applied to the selected wordline to program all of the programming levels (e.g., L1 to L7 for a TLC memory device) together. In an embodiment, the first phase and the second phase can be iteratively performed until the programming of all of the programming levels has been verified. In an embodiment, each iteration of the second phase of the programming operation includes the application of a programming pulse, where the magnitude is increased (e.g., by the predefined pulse step height) relative to the previous iteration.

Although the all levels programming approach can result in a significant reduction in the number of programming pulses that is needed to program all of the levels of the selected wordline, significant stress can be placed on the memory cells due to the delta between the voltage levels to which the respective pillars are boosted (i.e., Vpillar) and the incrementing voltage programming pulses applied to the selected wordline. Since the all levels programming approach utilizes relatively high voltage programming pulses for relatively short durations (i.e., a narrow pulse width), the program slope associated with this approach is relatively high. That is, the memory cell threshold voltage increase is high relative to the increase in programming voltage (e.g., 2 to 2.5 times greater). Since after the first programming pulse is applied, the memory cells in each programming level will be relatively close to their respective target threshold voltage levels, if the second programming pulse is increased by the predefined pulse step height, the possibility of overprogramming is introduced. Due to the large program slope, it is possible that the application of the second programing pulse can cause the memory cells being programed to increase above their respective target threshold voltage levels. This can hurt device performance and reliability, such as by increasing the programming time and/or introducing programming errors.

Aspects of the present disclosure address the above and other deficiencies by providing a novel technique for program voltage selection during all levels programming of a memory device in a memory sub-system. In one embodiment, control logic in the memory device, identifies a set of a plurality of memory cells associated with a selected wordline to be programmed to respective programming levels during a program operation. The control logic further causes a set of a plurality of pillars with which the set of the plurality of memory cells are associated to be boosted to respective pillar voltages corresponding to the respective programming levels. Once the pillars are posted to the respective pillar voltages, the control logic can cause a series of programming pulses to be applied to the selected wordline, wherein respective memory cells of the set of memory cells are programmed to each of the respective programming levels by each programming pulse in the series of programming pulses. For example, a first programming pulse in the series of programming pulses has a first magnitude and a second programming pulse in the series of programming pulses has a second magnitude. In one embodiment, rather than increasing the magnitude of each successive programming pulse by a predefined pulse step amount, the second magnitude of the second programming pulse is configured to be less than the first magnitude of the first programming pulse increased by a predefined pulse step amount. For example, the second magnitude of the second programming pulse can be equal to or less than the first magnitude of the first programming pulse. The magnitudes of subsequent programming pulses following the second programming pulse can each be increased by the predefined pulse step amount relative to the previous programming pulse.

Advantages of this approach include, but are not limited to, improved performance in the memory sub-system. The approach described herein allows for memory cells in the memory array to be programmed to all programming levels during the application of each programming pulse, which can reduce the number of programming pulses that is needed, thereby also reducing the total programming time. In addition, since the magnitude of the second programming pulse is reduced to a level that is lower than it would have been if it were increased by the predefined pulse step amount, the likelihood of overprogramming occurring is reduced. This improves device performance and reliability, such as by reducing the programming time and/or reducing the occurrence of programming errors.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In one embodiment, the memory sub-system 110 includes a memory interface component 113, which includes suspend manager 114. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. In some embodiments, the memory sub-system controller 115 includes at least a portion of the memory interface 113. For example, the memory sub-system controller 115 can include a processor 117 (processing device) configured to execute instructions stored in local memory 119 for performing the operations described herein. In some embodiments, the memory interface component 113 is part of the host system 110, an application, or an operating system.

In one embodiment, memory device 130 includes a program manager 134 configured to carry out corresponding memory access operations, in response to receiving the memory access commands from memory interface 113. In some embodiments, local media controller 135 includes at least a portion of program manager 134 and is configured to perform the functionality described herein. In some embodiments, program manager 134 is implemented on memory device 130 using firmware, hardware components, or a combination of the above. In one embodiment, program manager 134 receives, from a requestor, such as memory interface 113, a request to program data to a memory array of memory device 130. The memory array can include an array of memory cells formed at the intersections of wordlines and bitlines. In one embodiment, the memory cells are grouped into blocks, which can be further divided into sub-blocks, where a given wordline is shared across a number of sub-blocks, for example. In one embodiment, each sub-block corresponds to a separate plane in the memory array. The group of memory cells associated with a wordline within a sub-block can be referred to as a physical page. In one embodiment, there can be multiple portions of the memory array, such as a first portion where the sub-blocks are configured as SLC memory and a second portion where the sub-blocks are configured as multi-level cell (MLC) memory (i.e., including memory cells that can store two or more bits of information per cell). For example, the second portion of the memory array can be configured as TLC memory. The voltage levels of the memory cells in TLC memory form a set of 8 programming distributions representing the 8 different combinations of the three bits stored in each memory cell. Depending on how they are configured, each physical page in one of the sub-blocks can include multiple page types. For example, a physical page formed from single level cells (SLCs) has a single page type referred to as a lower logical page (LP). Multi-level cell (MLC) physical page types can include LPs and upper logical pages (UPs), TLC physical page types are LPs, UPs, and extra logical pages (XPs), and QLC physical page types are LPs, UPs, XPs and top logical pages (TPs). For example, a physical page formed from memory cells of the QLC memory type can have a total of four logical pages, where each logical page can store data distinct from the data stored in the other logical pages associated with that physical page.

In one embodiment, program manager 134 can receive data to be programmed to the memory device 130 (e.g., a TLC memory device). Accordingly, program manager 134 can execute an all levels programming operation to program each memory cell to one of 8 possible programming levels (i.e., voltages representing the 8 different values of those three bits). In one embodiment, program manager 134 can program memory cells in the TLC portion of the memory array to all of the multiple respective programming levels (e.g., programming levels L0, L1, L2. . . . L7) with each programming pulse. For example, upon identifying a set of memory cells to be programmed (e.g., the memory cells associated with one or more wordlines of the memory array), program manager 134 can execute a first phase of the all levels programming operation wherein a ramping wordline voltage is applied and each pillar corresponding to the respective programming levels is floated. In an embodiment, a voltage of each pillar (Vpillar) when floated can be boosted using the ramping wordline voltage.

In one embodiment, the program manager 134 can execute a second phase of the all levels programming operation to cause a series of programming pulses to be applied to the identified set of memory cells to program those memory cells to each of the multiple respective programming levels (i.e., L1, L2, . . . . L7). In an embodiment, the program manager 134 can perform a program verify operation corresponding to each programming pulse and programming level to verify whether the memory cells in the set were programmed to all of the respective programming levels. The program manager 134 can execute the first phase and the second phase (wherein each iteration of the second phase includes the application of programming pulse) until all of the programming levels have reached the corresponding target program voltage level. In one embodiment, rather than increasing the magnitude of each successive programming pulse by a predefined pulse step amount, the magnitude of the second programming pulse in the series is configured to be less than the magnitude of the first programming pulse if it were increased by a predefined pulse step amount. For example, the magnitude of the second programming pulse can be equal to or less than the first magnitude of the first programming pulse. The magnitudes of subsequent programming pulses following the second programming pulse can each be increased by the predefined pulse step amount relative to the previous programming pulse. Further details with regards to the operations of program manager 134 are described below.

Figure 1B:
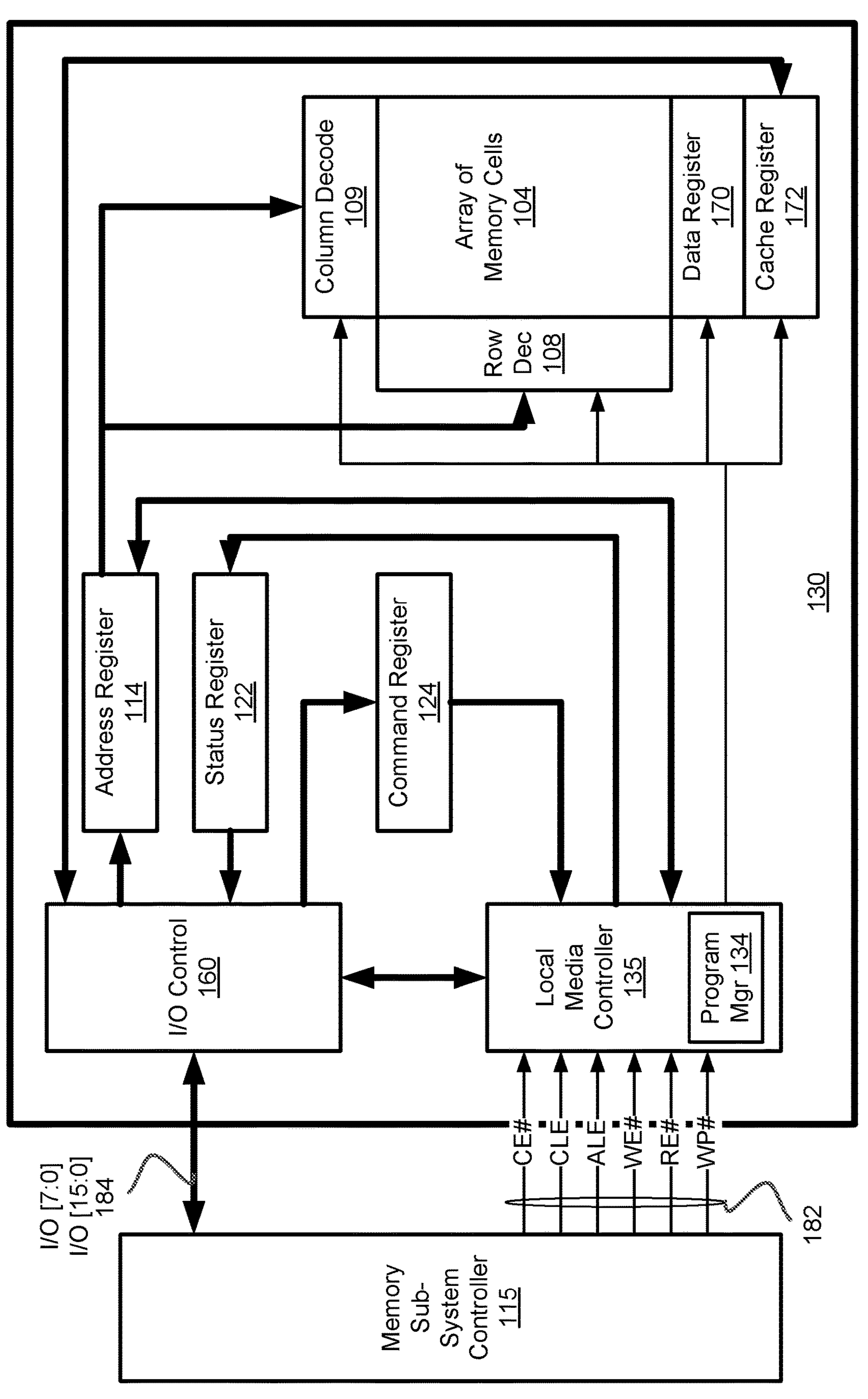
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, local media controller 135 includes program manager 134, which can implement the all levels programming of memory device 130, as described herein.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 182. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 182 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 184 and outputs data to the memory sub-system controller 115 over I/O bus 184.

For example, the commands may be received over input/output (I/O) pins [7:0] of I/O bus 184 at I/O control circuitry 160 and may then be written into command register 124. The addresses may be received over input/output (I/O) pins [7:0] of I/O bus 184 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
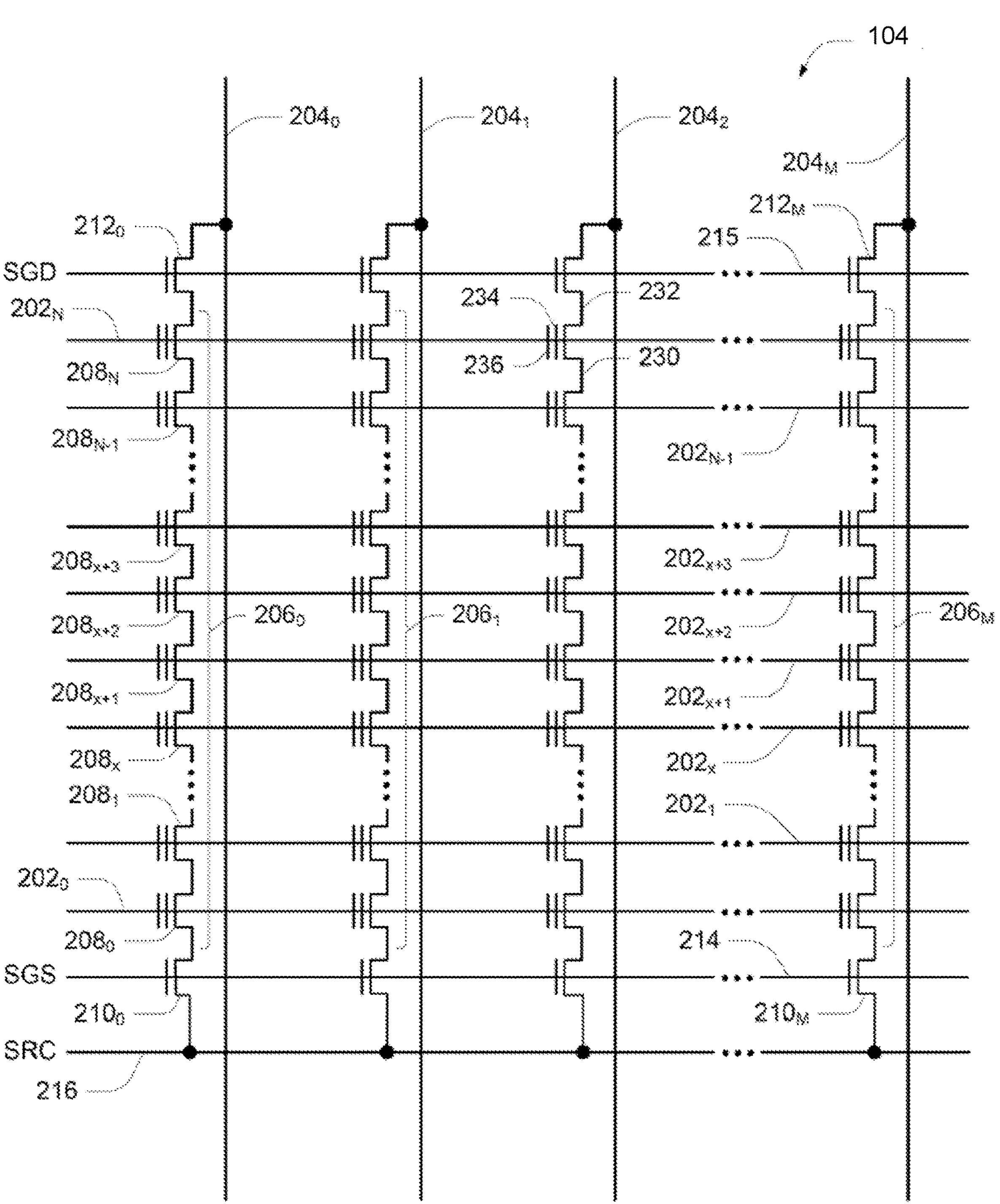
FIG. 2 is a schematic of portions of an array of memory cells as could be used in a memory of the type described with reference to FIG. 1B in accordance with some embodiments of the present disclosure.

FIG. 2 is a schematic of portions of an array of memory cells 104, such as a NAND memory array, as could be used in a memory of the type described with reference to FIG. 1B according to an embodiment. Memory array 104 includes access lines, such as wordlines $\mathbf{202}_0$ to $\mathbf{202}_N$, and data lines, such as bit lines $\mathbf{204}_0$ to $\mathbf{204}_M$. The wordlines 202 can be connected to global access lines (e.g., global wordlines), not shown in FIG. 2, in a many-to-one relationship. For some embodiments, memory array 104 can be formed over a semiconductor that, for example, can be conductively doped to have a conductivity type, such as a p-type conductivity, e.g., to form a p-well, or an n-type conductivity, e.g., to form an n-well.

Memory array 104 can be arranged in rows (each corresponding to a wordline 202) and columns (each corresponding to a bit line 204). Each column can include a string of series-connected memory cells (e.g., non-volatile memory cells), such as one of NAND strings $\mathbf{206}_0$ to $\mathbf{206}_M$. Each NAND string 206 can be connected (e.g., selectively connected) to a common source (SRC) 216 and can include memory cells $\mathbf{208}_0$ to $\mathbf{208}_N$. The memory cells 208 can represent non-volatile memory cells for storage of data. The memory cells 208 of each NAND string 206 can be connected in series between a select gate 210 (e.g., a field-effect transistor), such as one of the select gates $\mathbf{210}_0$ to $\mathbf{210}_M$ (e.g., that can be source select transistors, commonly referred to as select gate source), and a select gate 212 (e.g., a field-effect transistor), such as one of the select gates $\mathbf{212}_0$ to $\mathbf{212}_M$ (e.g., that can be drain select transistors, commonly referred to as select gate drain). Select gates $\mathbf{210}_0$ to $\mathbf{210}_M$ can be commonly connected to a select line 214, such as a source select line (SGS), and select gates $\mathbf{212}_0$ to $\mathbf{212}_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $\mathbf{208}_0$ of the corresponding NAND string 206. For example, the drain of select gate $\mathbf{210}_0$ can be connected to memory cell $\mathbf{208}_0$ of the corresponding NAND string $\mathbf{206}_0$. Therefore, each select gate 210 can be configured to selectively connect a corresponding NAND string 206 to the common source 216. A control gate of each select gate 210 can be connected to the select line 214.

The drain of each select gate 212 can be connected to the bit line 204 for the corresponding NAND string 206. For example, the drain of select gate $\mathbf{212}_0$ can be connected to the bit line $\mathbf{204}_0$ for the corresponding NAND string $\mathbf{206}_0$. The source of each select gate 212 can be connected to a memory cell $\mathbf{208}_N$ of the corresponding NAND string 206. For example, the source of select gate $\mathbf{212}_0$ can be connected to memory cell $\mathbf{208}_N$ of the corresponding NAND string 2060. Therefore, each select gate 212 can be configured to selectively connect a corresponding NAND string 206 to the corresponding bit line 204. A control gate of each select gate 212 can be connected to select line 215.

The memory array 104 in FIG. 2 can be a quasi-two-dimensional memory array and can have a generally planar structure, e.g., where the common source 216, NAND strings 206 and bit lines 204 extend in substantially parallel planes. Alternatively, the memory array 104 in FIG. 2 can be a three-dimensional memory array, e.g., where NAND strings 206 can extend substantially perpendicular to a plane containing the common source 216 and to a plane containing the bit lines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bit line 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $\mathbf{202}_N$ and selectively connected to even bit lines 204 (e.g., bit lines $\mathbf{204}_0$, $\mathbf{204}_2$, $\mathbf{204}_4$, etc.) can be one physical page of the memory cells 208 (e.g., even memory cells) while memory cells 208 commonly connected to wordline 202*N* and selectively connected to odd bit lines 204 (e.g., bit lines $\mathbf{204}_1$, $\mathbf{204}_3$, $\mathbf{204}_5$, etc.) can be another physical page of the memory cells 208 (e.g., odd memory cells).

Although bit lines $\mathbf{204}_3$-$\mathbf{204}_5$ are not explicitly depicted in FIG. 2, it is apparent from the figure that the bit lines 204 of the array of memory cells 104 can be numbered consecutively from bit line $\mathbf{204}_0$ to bit line $\mathbf{204}_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $\mathbf{202}_0$-$\mathbf{202}_N$ (e.g., all NAND strings 206 sharing common wordlines 202). Unless expressly distinguished, a reference to a page of memory cells herein refers to the memory cells of a logical page of memory cells. Although the example of FIG. 2 is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 3:
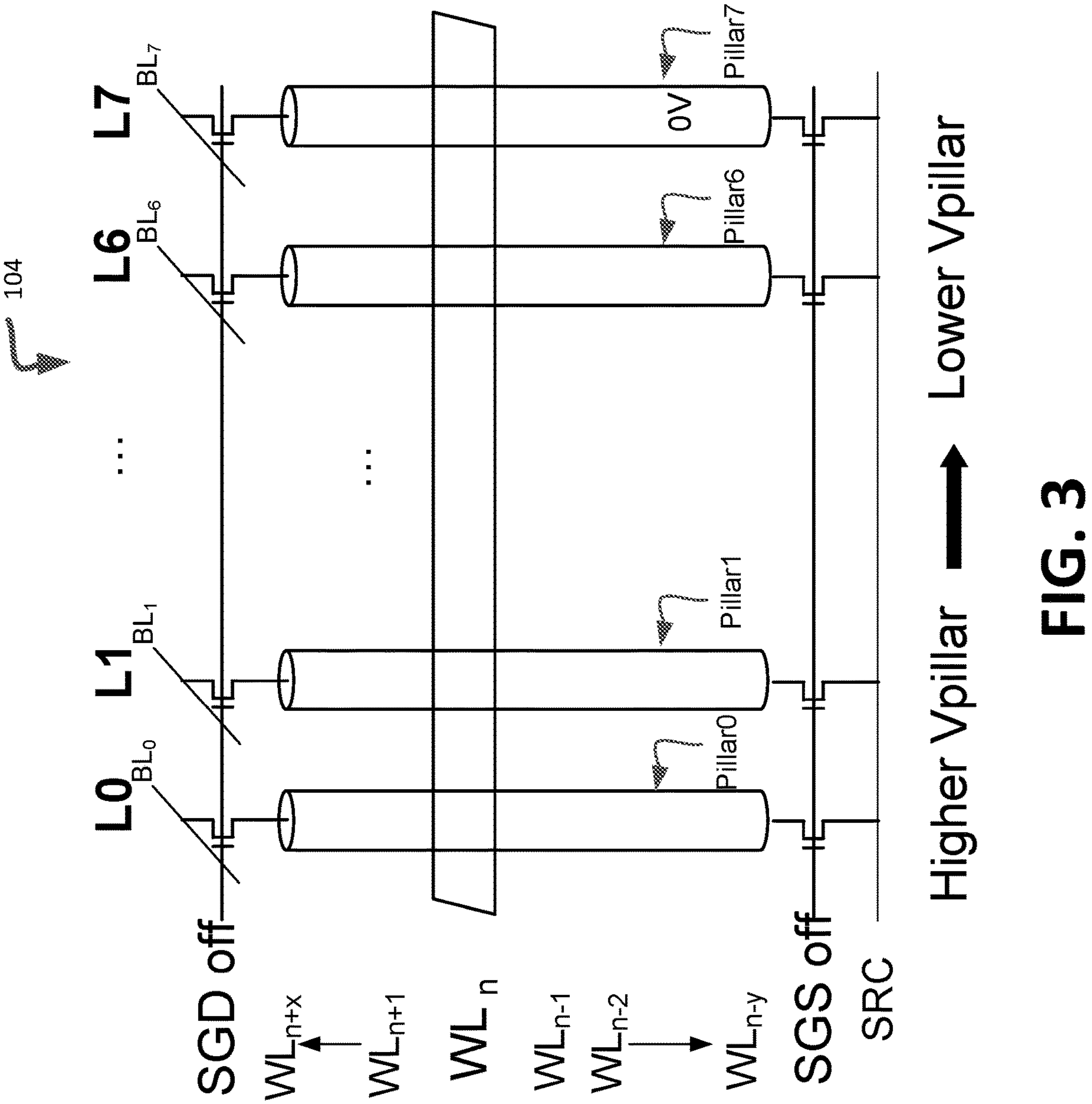
FIG. 3 illustrates an example memory array including wordlines and bitlines corresponding to multiple programming levels to be programmed according to an all levels programming operation in accordance with one or more embodiments of the present disclosure.

FIG. 3 illustrates an example set of pillars in an example memory array 104. As shown in FIG. 3, the example memory array 104 of a TLC memory device includes wordlines (e.g., a selected wordline (WLn) and unselected wordlines (WLn+1 to WLn+x and WLn−1 to WLn-y)) and a set of bitlines (e.g., BL0 to BL7) corresponding to an erase level (L0) and multiple programming levels (L1, . . . . L7) to be programmed according to an all levels programming operation in accordance with one or more embodiments of the present disclosure. As shown in FIG. 3, the memory array 104 may be arranged in rows (each corresponding to a wordline) and columns (each corresponding to a bitline), wherein the intersection of a wordline and bitline constitutes the address of the memory cell. Each column may include a string of serially-connected memory cells connected (e.g., selectively connected) to a common source (SRC). The common source can be coupled to a reference voltage (e.g., ground voltage or simply "ground" (Gnd) or a voltage source (e.g., a charge pump circuit or power supply which may be selectively configured to a particular voltage suitable for optimizing a programming operation, for example). A string of memory cells may be connected in series between a first select transistor (e.g., a source-side select transistor) referred to as a source select gate (SGS) and a second select transistor (e.g., a drain-side select transistor) referred to as a drain select gate (SGD). The source select transistors may be commonly connected to a first select line (e.g., a source select line) and the drain select transistors may be commonly connected to a second select line (e.g., a drain select line).

As shown in FIG. 3, the memory array 104 includes a set of pillars (e.g., Pillar0, Pillar1 . . . Pillar7) corresponding to substantially vertical strings of series coupled memory cells of the memory array 104. In an embodiment, the pillars refer to the channel regions (e.g., composed of polysilicon) of the access transistors of a vertical string of memory cells. According to embodiments, each of the pillars are floated and a corresponding voltage is boosted at different voltage levels (Vpillar) at different times by turning the source-side select transistor (SGS) and the drain-side select transistor (SGD) off. In an embodiment, the channel region is first discharged to ground before being floated and boosted to a particular voltage. In an embodiment, once a respective pillar is floated, a voltage of each pillar (Vpillar) can be boosted or increased in accordance with a step or increase of a ramping wordline voltage.

In an embodiment, the processing logic (e.g., program manager 134) identifies a set of memory cells to be programmed by an all levels programming operation (e.g., a set of memory cells associated with WLn). In an embodiment, the all levels programming operation includes a first phase wherein a ramping wordline voltage is applied to both the selected and unselected wordlines. For example, the voltage is incrementally ramped from 0V to 3V over a period of time. While the ramping wordline voltage is applied, a set of pillars corresponding to different programming levels are sequentially floated (e.g., by uncoupling the set of pillars). At the end of the first phase, the pillar voltage levels (Vpillar) are boosted to different voltage levels (e.g., Vpillar for programming level L1 is boosted to a highest value, Vpillar for programming level L2 is boosted to a next highest value and so on to Vpillar for programming level LO which remains approximately 0V during the first phase).

Figure 4:
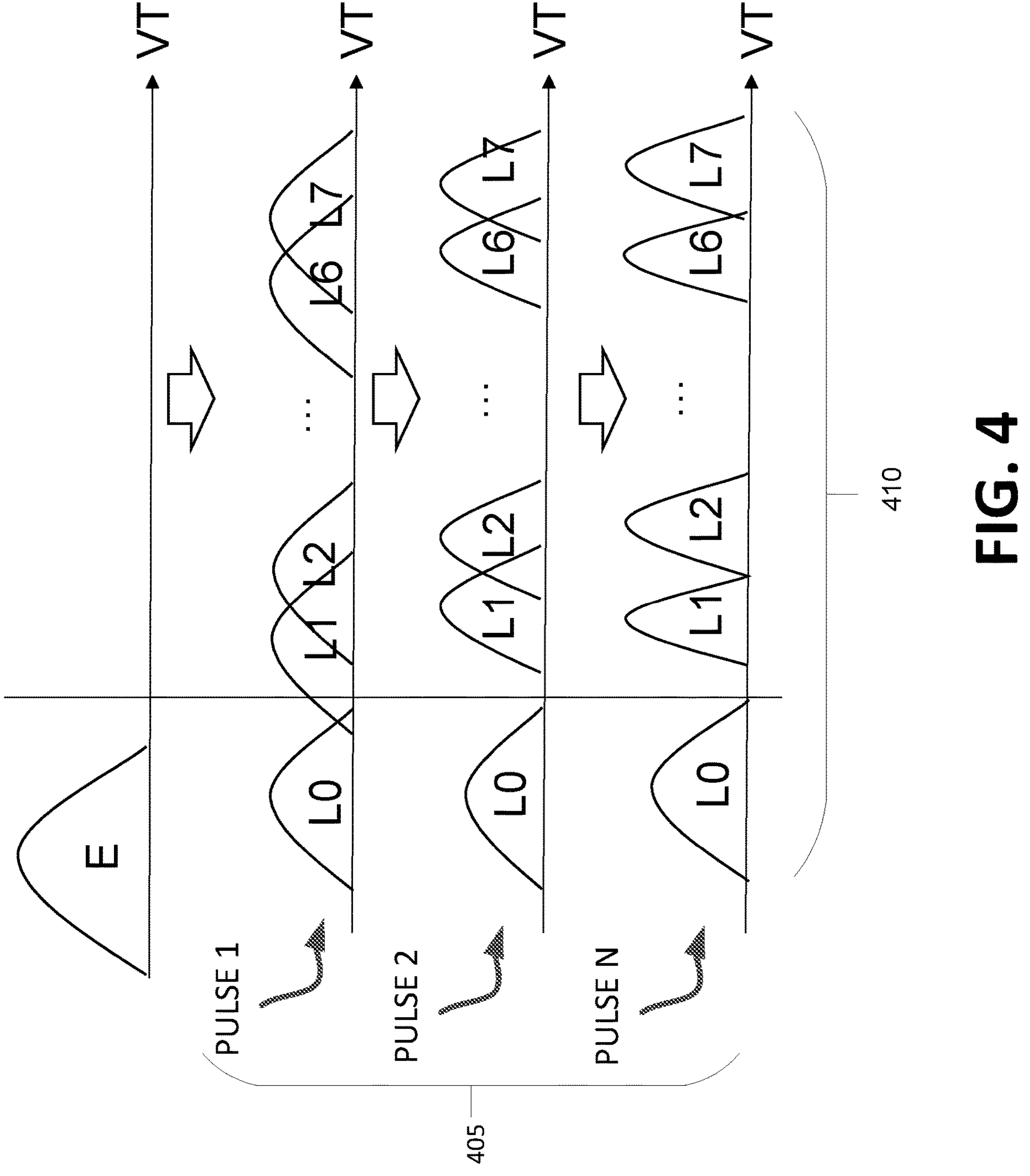
FIG. 4 illustrates an example programming operation including multiple pulses used for all levels programming of a memory device in a memory sub-system in accordance with one or more embodiments of the present disclosure.

FIG. 4 illustrates an example programming operation including a set of multiple pulses 405 (e.g., pulse 1, pulse 2 . . . pulse N) applied to program all programming levels (e.g., L1, L2, . . . . L7) of the identified set of memory cells of the memory array, according to embodiments of the present disclosure. As shown in FIG. 4, each respective pulse (e.g., Pulse 1, Pulse 2 . . . and Pulse N) is used to program each of programming levels (e.g., L1 to L7) of a memory device in a memory sub-system in accordance with one or more embodiments of the present disclosure. In an embodiment, each pulse programs an entire set of program levels 410 (e.g., all levels) of the memory cells together. In an embodiment, the set of pulses 405 are applied to a selected wordline (e.g., WLn) associated with the set of memory cells to be programmed, as shown and described with reference to FIG. 3.

As shown in FIG. 4, during the second phase of the all levels programming operation, a first programming pulse (e.g., Pulse 1) is applied to the selected wordline. In an embodiment, the first programming pulse programs each of the programming levels (e.g., L1 to L7). In an embodiment, a programming voltage (Vpgm) of each pulse is applied to the selected wordline to program each of the levels (L1 to L7 of a TLC memory device). In an embodiment, for the memory cells in a selected page, the same Vpgm_WL is applied on the second phase Vpgm. However, different Vpillars are setup during the first phase depending on the corresponding target data level. Since the single programming voltage is applied to the wordline, there can be varying deltas between the Vpillar of each pillar and that programming voltage. These varying deltas introduce different levels of stress on the corresponding memory cells, causing those memory cells to be programmed to the target voltages associated with L1 to L7. In an embodiment, a series of programming pulses (e.g., as shown in FIG. 4 as applied to the target wordline) is used to complete the programming of the set of programming levels. In an embodiment, for each pulse of the set of pulses applied, a program verify operation can be performed for each programming level to verify that target voltage corresponding to each respective programming level has been reached.

In the examples shown in FIG. 4, a set of programming pulses are applied to a selected wordline (WLn). In an embodiment, the unselected wordlines including are ramped to a pass voltage (Vpass) for programming levels L1 to L7. In an embodiment, the pillar potential may stay on approximately 0V through a conduction with corresponding bitline for L7 program or be inhibited on any of the seven voltages (e.g., between 0V and Vpass) for L0~L6 program, depending on user data levels. As described in more detail herein, the magnitudes of each programming pulse can vary. In one embodiment, the magnitude of the second programming pulse (i.e., Pulse 2) is configured to be less than the magnitude of the first programming pulse (i.e., Pulse 1) if it were increased by a predefined pulse step amount. For example, the magnitude of the second programming pulse exceed the magnitude of the first programming pulse by an amount less than the predefined pulse step amount, can be equal to the magnitude of the first programming pulse or can be less than the magnitude of the first programming pulse. The magnitudes of subsequent programming pulses (e.g., Pulse 3) following the second programming pulse can each be increased by the predefined pulse step amount relative to the previous programming pulse.

Figure 5:
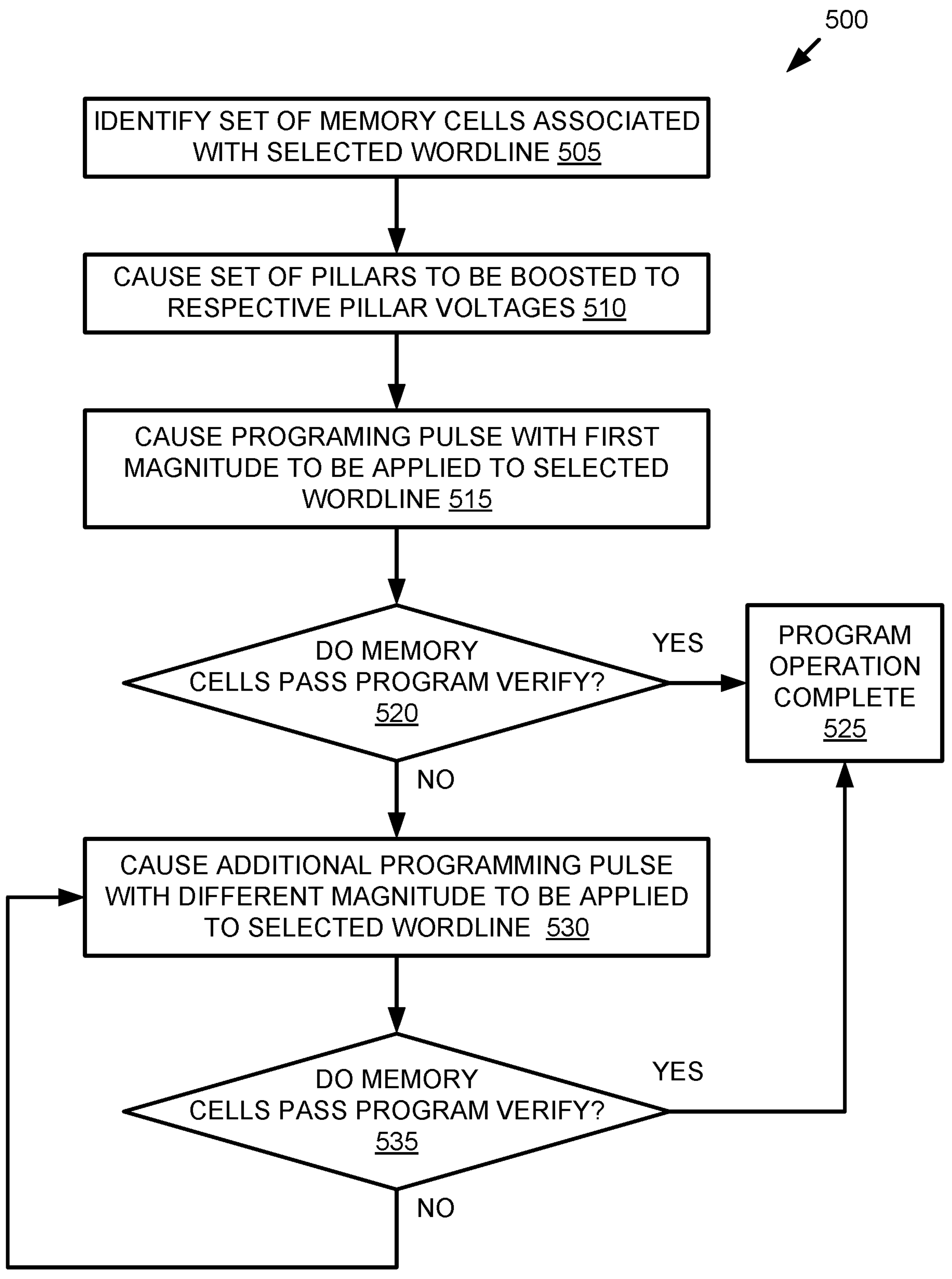
FIG. 5 is a flow diagram of an example method of all levels programming in a memory device of a memory sub-system in accordance with some embodiments of the present disclosure.

FIG. 5 is a flow diagram of an example method of all levels programming in a memory device of a memory sub-system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by local media controller 135 and/or program manager 134 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, a set of memory cells is identified. For example, processing logic (e.g., program manager 134) can receive, from a requestor, such as a memory interface 113 of a memory sub-system controller 115, a request to perform a memory access operation on a memory array, such as memory array 104, of a memory device, such as memory device 130. In one embodiment, the memory access operation comprises a program operation to program the set of memory cells to a set of programming levels (e.g., L1 to L7; wherein L0 is an erase state). In an embodiment, the program operation is directed to one or more specific memory cell addresses. In one embodiment, the processing logic can identify the set of memory cells (e.g., a subset of the memory cells of memory array 104, such as those memory cells associated with a certain wordline or multiple wordlines of memory array 104). In one embodiment, the set of memory cells are configured as xLC memory (e.g., any type of memory cells that store more than one bit per cell including 2 bits, 3 bits, 4 bits, or more bits per cell). In an embodiment, the identified set of memory cells are to be programmed to multiple programming levels (e.g., L1, L2. . . . L7 for a TLC memory device). In one embodiment, the request includes a set of physical or logical addresses corresponding to the set of memory cells to be programmed. In one embodiment, the processing logic identifies the set of memory cells based on the set of addresses provided as part of the request.

At operation 510, a set of pillars are boosted. For example, the processing logic can cause a set pillars with which the set of the plurality of memory cells are associated, such as Pillar0-Pillar7 of memory array 104, to be boosted to respective pillar voltages (i.e., Vpillar) corresponding to the respective programming levels. In one embodiment, as a ramping wordline voltage is applied to a set of wordlines (e.g., WLn+x to WLn−y), the set of pillars are floated in sequence. In one embodiment, the pillars refer to the channel regions (e.g., composed of polysilicon) of the access transistors of a vertical string of memory cells. In one embodiment, by floating each pillar associated with a respective programming level at different times in operation, each pillar is exposed to a different length of the wordline voltage ramp process while in the floating state. As a result, each pillar is boosted to a respective voltage (i.e., Vpillar), corresponding to a respective programming level, as a function of the different exposure times associated with the ramping wordline voltage. For example, a first pillar that is floated first in sequence is exposed to a longest relative length of time of the wordline voltage and, as such, is boosted to a highest voltage level, a second pillar that is floated second in sequence is exposed to a next longest relative length of time of the wordline voltage and, as such, is boosted to a next highest voltage level, and so on.

For example, the processing logic can cause a disconnection of a set of pillars associated with the set of memory cells from a voltage supply and ground voltage (i.e., ground), wherein each pillar corresponds to a programming level of a set of programming levels (e.g., L1 to L7 for a TLC memory device). In an embodiment, during the first phase of the all levels programming operation, respective pillars (e.g., vertical conductive traces of the memory array) corresponding to programming levels (e.g., L1 to L6 for a TLC memory device) are floated (e.g., disconnected from both a voltage supply and a ground). In an embodiment, the set of pillars corresponding to different programming levels are floated in sequence during the first phase (e.g., a first pillar corresponding to L1 is floated at a first time, a second pillar corresponding to L2 is floated at a second time, and so on).

In an embodiment, the pillars are floated by turning a corresponding source-side select transistor (SGD) and a corresponding drain-side select transistor (SGS) off. In an embodiment, a pillar can be floated by turning both a select gate source (SGS) off and select gate drain (SGD) off (e.g., a selected SGD is toggled from a high voltage level (e.g., Vsgd_high) to approximately 0V to prevent a corresponding bitline from discharging to the corresponding pillar). In an embodiment, a bitline corresponding to the first pillar associated with the programming level L1 is toggled from approximately 0V to a high voltage level (e.g., $V_{BL\_high}$) to ensure the pillar remains floating during the remainder of the first phase (e.g., application of the ramping wordline voltage).

In an embodiment, once floated, a voltage of each pillar (Vpillar) can be periodically boosted or increased in accordance with each step or increase of the ramping wordline voltage (e.g., each step of the ramping wordline voltage increases or boosts the pillar voltage for a pillar that is floating). At the end of the first phase, the pillar voltage levels (Vpillar) are boosted to different voltage levels (e.g., Vpillar for programming level L1 is boosted to a highest value, Vpillar for programming level L2 is boosted to a next highest value and so on to Vpillar for programming level L0 which remains approximately 0V during the first phase). Thus, the magnitudes of the respective pillar voltages are inversely proportional to the respective programming levels to which the associated memory cells are being programmed.

At operation 515, a programming pulse is applied. For example, the processing logic can cause a programming pulse to be applied to the selected wordline (e.g., WLn of memory array 104), wherein respective memory cells of the set of memory cells are programmed to each of the respective programming levels by each programming pulse in the series of programming pulses. In an embodiment, the boosting of the pillar voltages during the first phase enables the programming of all of the programming levels together using each programming pulse, the memory cells of the respective programming levels can be raised to the corresponding target voltage level in quicker and more efficient manner. In one embodiment, the programming pulse is the first in a series of programming pulses that are applied during the all levels program operation.

At operation 520, a determination is made. For example, the processing logic can perform a program verify operation for each programming level to verify that target voltage corresponding to each respective programming level has been reached. In an embodiment, the processing logic completes the execution of method 500 at operation 525 in response to verifying (using program verify operations) that all of the programming levels have been programmed (e.g., following the application of set of pulses in accordance with the performance of operations 510 to 520). In an example, the all levels programming operation can include a set of pulses (e.g., five pulses) to program seven programming levels, resulting in the application of thirty-five program verify operations.

Figures 6A, 6B, 6C:
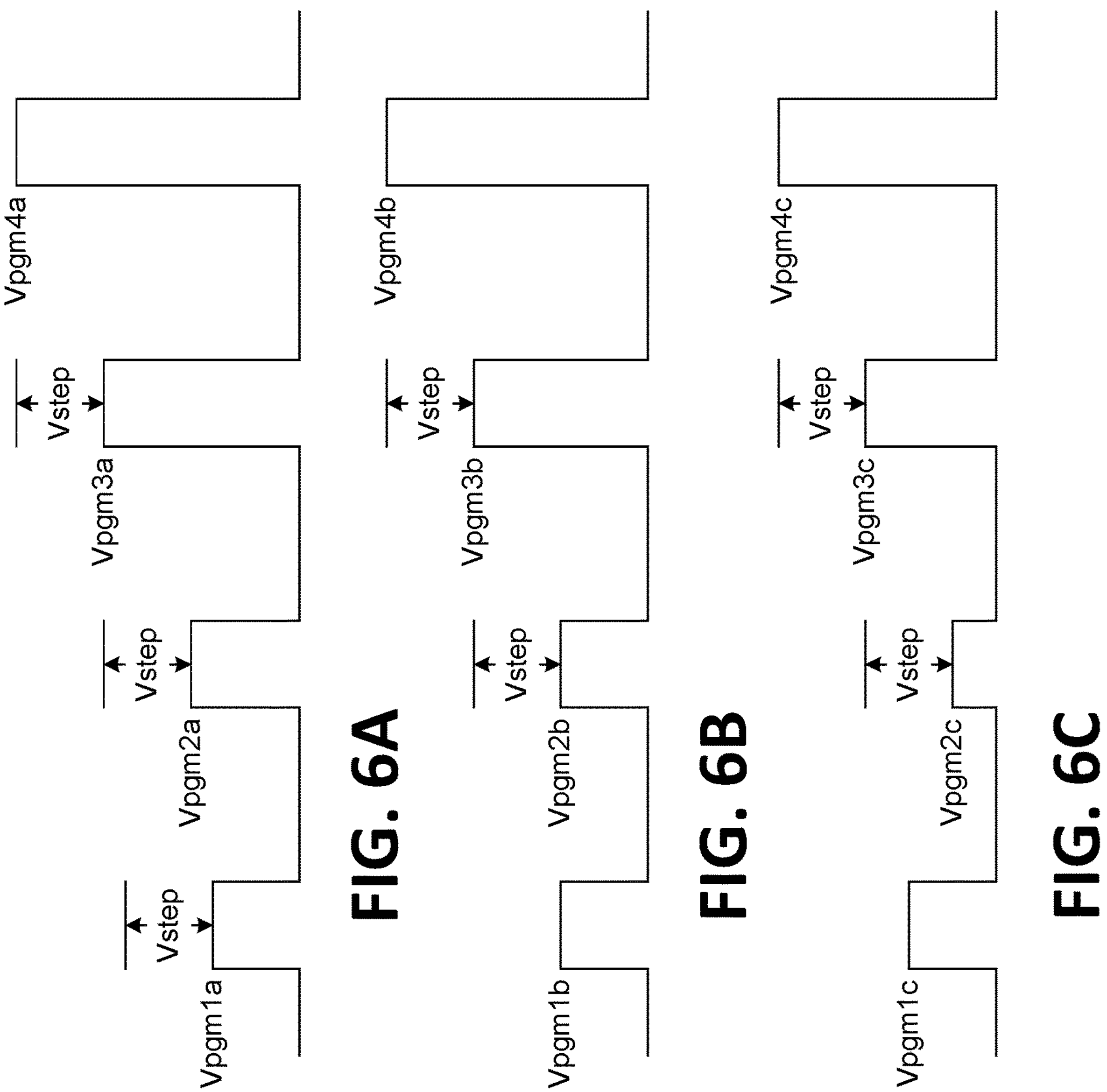
FIGS. 6A-6C illustrate example programming pulses used for all levels programming of a memory device in a memory sub-system in accordance with one or more embodiments of the present disclosure.

If the memory cells being programmed do not pass the program verify operation, at operation 530, an additional programming pulse is applied. For example, the processing logic can cause a programming pulse (i.e., a second programming pulse) to be applied to the selected wordline (e.g., WLn of memory array 104). In one embodiment, the first programming pulse in the series of programming pulses has a first magnitude and the second programming pulse in the series of programming pulses has a second magnitude. In one embodiment, the second magnitude of the second programming pulses is less than the first magnitude of the first programming pulse increased by a predefined pulse step amount. For example, as shown in FIG. 6A, the first pulse has a default program voltage (Vpgm1$a$) and the second pulse has a different program voltage (Vpgm2$a$). As illustrated, while Vpgm2$a$ is greater than Vpgm1$a$, Vpgm2$a$ is still less than if Vpgm1$a$ had been increased by the predefined pulse step amount (Vstep). In one embodiment, Vstep is predefined amount by which successive programming pulses are increased in the memory device. As further illustrated, the remaining pulses in the series of programming pulses can be incremented by Vstep relative to the magnitude of the previous pulse. For example, a third pulse has a program voltage (Vpgm3$a$) which is greater than Vpgm2$a$ by Vstep, and a fourth pulse has a program voltage (Vpgm4$a$) which is greater than Vpgm3$a$ by Vstep.

In another embodiment, the second magnitude of the second programming pulse is equal to the first magnitude of the first programming pulse. For example, as shown in FIG. 6B, the first pulse has a default program voltage (Vpgm1$b$) and the second pulse has the same program voltage (Vpgm2$b$). As further illustrated, the remaining pulses in the series of programming pulses can be incremented by Vstep relative to the magnitude of the previous pulse. For example, a third pulse has a program voltage (Vpgm3$b$) which is greater than Vpgm2$b$ by Vstep, and a fourth pulse has a program voltage (Vpgm4$b$) which is greater than Vpgm3$b$ by Vstep.

In another embodiment, the second magnitude of the second programming pulse is less than the first magnitude of the first programming pulse. For example, as shown in FIG. 6C, the first pulse has a default program voltage (Vpgm1$c$) and the second pulse has a lower program voltage (Vpgm2$c$). As further illustrated, the remaining pulses in the series of programming pulses can be incremented by Vstep relative to the magnitude of the previous pulse. For example, a third pulse has a program voltage (Vpgm3$c$) which is greater than Vpgm2$c$ by Vstep, and a fourth pulse has a program voltage (Vpgm4$c$) which is greater than Vpgm3$c$ by Vstep.

At operation 535, a determination is made. For example, the processing logic can perform a program verify operation for each programming level to verify that target voltage corresponding to each respective programming level has been reached. In an embodiment, the processing logic completes the execution of method 500 at operation 525 in response to verifying (using program verify operations) that all of the programming levels have been programmed (e.g., following the application of set of pulses in accordance with the performance of operations 510 to 530). In an example, the all levels programming operation can include a set of pulses (e.g., five pulses) to program seven programming levels, resulting in the application of thirty-five program verify operations. If the memory cells being programmed do not pass the program verify operation, processing can return to operation 530, where additional programming pulses can be applied (e.g., Pulse 3, Pulse 4), as described above.

In an embodiment, operations 510-535 can be iteratively executed. For example, operations 510-535 can be iteratively performed to enable the execution of pulse 1, pulse 2 . . . pulse N of FIG. 4 until all of the programming levels (e.g., L1 to L7) have been programmed.

Figure 7:
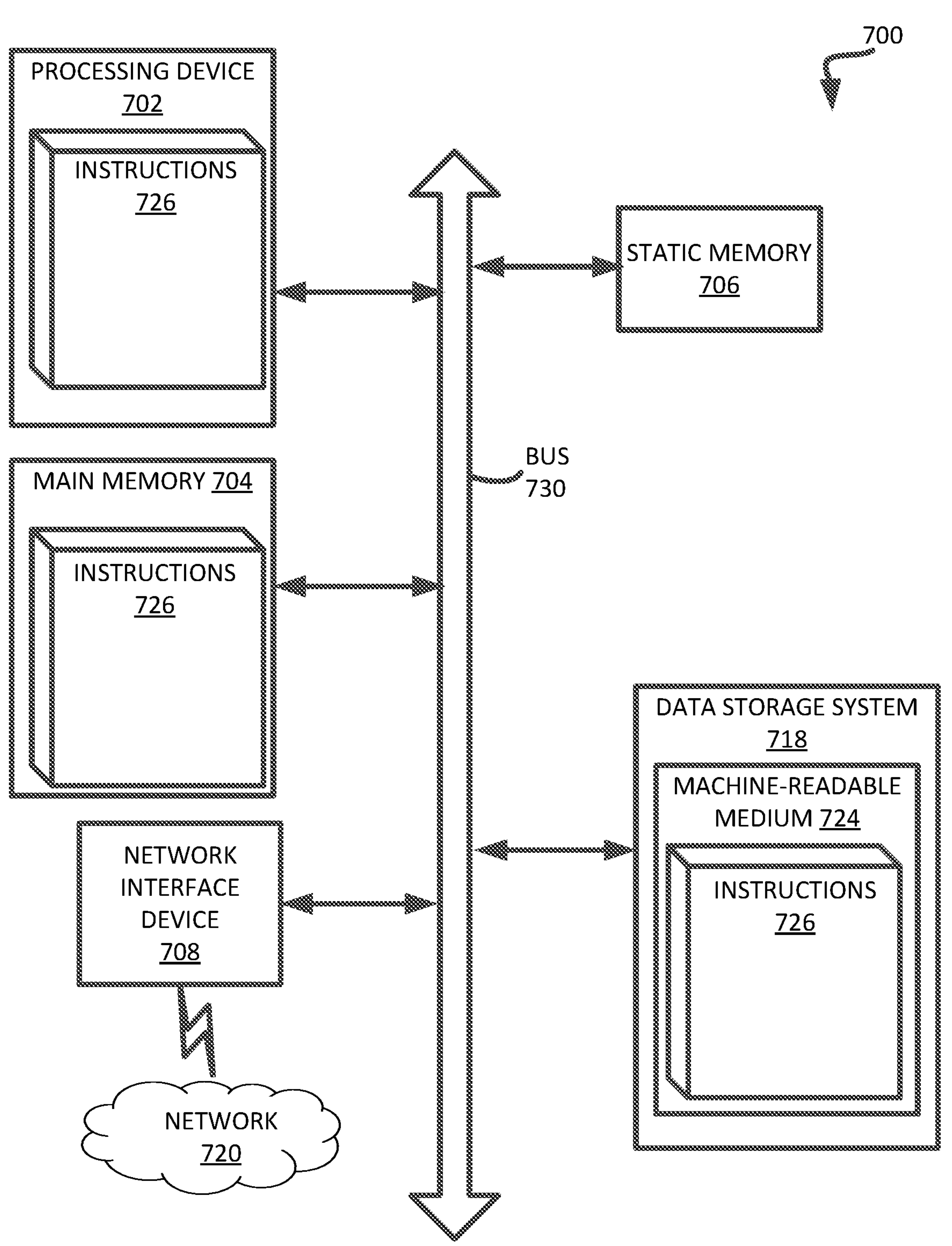
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the local media controller 135 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to the local media controller 135 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:

a memory array comprising a plurality of memory cells associated with a plurality of pillars and configured as multi-level cell memory; and control logic, operatively coupled with the memory array, to perform operations comprising:

identifying a set of the plurality of memory cells associated with a selected wordline to be programmed to respective programming levels during a program operation;

causing a set of the plurality of pillars with which the set of the plurality of memory cells are associated to be boosted to respective pillar voltages corresponding to the respective programming levels to enable programming of all of the respective programming levels with each pulse of a series of programming pulses, wherein magnitudes of the respective pillar voltages are inversely proportional to the respective programming levels to which the associated memory cells are being programmed; and causing the series of programming pulses to be applied to the selected wordline subsequent to the set of the plurality of pillars being boosted to the respective pillar voltages, wherein respective memory cells of the set of memory cells are programmed simultaneously to each of the respective programming levels by each programming pulse in the series of programming pulses, wherein a first programming pulse in the series of programming pulses has a first magnitude and is an initial pulse in the series of programing pulses, wherein a second programming pulse in the series of programming pulses has a second magnitude and is subsequent to the initial pulse in the series of programming pulses, and wherein a difference between the second magnitude of the second programming pulse and the first magnitude of the first programming pulse is less than a predefined pulse step amount.

2. The memory device of claim 1, wherein the second magnitude of the second programming pulse is equal to the first magnitude of the first programming pulse.

3. The memory device of claim 1, wherein the second magnitude of the second programming pulse is less than the first magnitude of the first programming pulse.

4. The memory device of claim 1, wherein a third programming pulse in the series of programming pulses has a third magnitude, and wherein the third magnitude of the third programming pulse is equal to the second magnitude of the second programming pulse increased by the predefined pulse step amount.

5. The memory device of claim 4, wherein a fourth programming pulse in the series of programming pulses has a fourth magnitude, and wherein the fourth magnitude of the fourth programming pulse is equal to the third magnitude of the third programming pulse increased by the predefined pulse step amount.

6. The memory device of claim 1, wherein the control logic is to perform further operations comprising:

subsequent to each program pulse in the series of programming pulses being applied to the selected wordline, performing a corresponding program verify operation to verify whether the set of the plurality of memory cells were programmed to the respective programming levels.

7. A method comprising:

identifying a set of memory cells associated with a selected wordline of a memory device to be programmed to respective programming levels during a program operation;

causing a set of pillars with which the set of memory cells are associated to be boosted to respective pillar voltages corresponding to the respective programming levels to enable programming of all of the respective programming levels with each pulse of a series of programming pulses, wherein magnitudes of the respective pillar voltages are inversely proportional to the respective programming levels to which the associated memory cells are being programmed; and causing the series of programming pulses to be applied to the selected wordline subsequent to the set of pillars being boosted to the respective pillar voltages, wherein respective memory cells of the set of memory cells are programmed simultaneously to each of the respective programming levels by each programming pulse in the series of programming pulses, wherein a first programming pulse in the series of programming pulses has a first magnitude and is an initial pulse in the series of programing pulses, wherein a second programming pulse in the series of programming pulses has a second magnitude and is subsequent to the initial pulse in the series of programming pulses, and wherein a difference between the second magnitude of the second programming pulse and the first magnitude of the first programming pulse is less than a predefined pulse step amount.

8. The method of claim 7, wherein the second magnitude of the second programming pulse is equal to the first magnitude of the first programming pulse.

9. The method of claim 7, wherein the second magnitude of the second programming pulse is less than the first magnitude of the first programming pulse.

10. The method of claim 7, wherein a third programming pulse in the series of programming pulses has a third magnitude, and wherein the third magnitude of the third programming pulse is equal to the second magnitude of the second programming pulse increased by the predefined pulse step amount.

11. The method of claim 10, wherein a fourth programming pulse in the series of programming pulses has a fourth magnitude, and wherein the fourth magnitude of the fourth programming pulse is equal to the third magnitude of the third programming pulse increased by the predefined pulse step amount.

12. The method of claim 7, further comprising:

subsequent to each program pulse in the series of programming pulses being applied to the selected wordline, performing a corresponding program verify operation to verify whether the set of memory cells were programmed to the respective programming levels.

13. A memory device comprising:

a memory array comprising a plurality of memory cells associated with a plurality of pillars; and control logic, operatively coupled with the memory array, to perform operations comprising:

identifying a set of the plurality of memory cells associated with a selected wordline to be programmed to respective programming levels during a program operation;

causing a set of the plurality of pillars with which the set of the plurality of memory cells are associated to be boosted to respective pillar voltages corresponding to the respective programming levels to enable programming of all of the respective programming levels with each pulse of a series of programming pulses, wherein magnitudes of the respective pillar voltages are inversely proportional to the respective programming levels to which the associated memory cells are being programmed; and causing the series of programming pulses to be applied to the selected wordline subsequent to the set of the plurality of pillars being boosted to the respective pillar voltages, wherein respective memory cells of the set of memory cells are programmed simultaneously to each of the respective programming levels by each programming pulse in the series of programming pulses, wherein a first programming pulse in the series of programming pulses has a first magnitude and is an initial pulse in the series of programing pulses, wherein a second programming pulse in the series of programming pulses has a second magnitude and is subsequent to the initial pulse in the series of programming pulses, and wherein the second magnitude of the second programming pulse is less than the first magnitude of the first programming pulse.

14. The memory device of claim 13, wherein a third programming pulse in the series of programming pulses has a third magnitude, and wherein the third magnitude of the third programming pulse is equal to the second magnitude of the second programming pulse increased by a predefined pulse step amount.

15. The memory device of claim 14, wherein a fourth programming pulse in the series of programming pulses has a fourth magnitude, and wherein the fourth magnitude of the fourth programming pulse is equal to the third magnitude of the third programming pulse increased by the predefined pulse step amount.

16. The memory device of claim 13, wherein the control logic is to perform further operations comprising:

subsequent to each program pulse in the series of programming pulses being applied to the selected wordline, performing a corresponding program verify operation to verify whether the set of the plurality of memory cells were programmed to the respective programming levels.

17. The memory device of claim 13, wherein the plurality of memory cells is configured as multi-level cell memory.

* * * * *